(12) United States Patent
Andoh (10) Patent No.: US 11,800,028 B2
(45) Date of Patent: Oct. 24, 2023

(54) CARD READING DEVICE AND CARD READING SYSTEM

(71) Applicant: Takayuki Andoh, Kanagawa (JP)

(72) Inventor: Takayuki Andoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/715,664

(22) Filed: Apr. 7, 2022

(65) Prior Publication Data

US 2022/0368805 A1 Nov. 17, 2022

(30) Foreign Application Priority Data

May 14, 2021 (JP) ................................. 2021-082718

(51) Int. Cl.
*H04N 1/04* (2006.01)
*H04N 1/00* (2006.01)
*H04N 1/44* (2006.01)

(52) U.S. Cl.
CPC ..... *H04N 1/00559* (2013.01); *H04N 1/00557* (2013.01); *H04N 1/00907* (2013.01); *H04N 1/4426* (2013.01)

(58) Field of Classification Search
CPC ........... H04N 1/00559; H04N 1/00557; H04N 1/00907; H04N 1/4426
See application file for complete search history.

(56) References Cited

U.S. PATENT DOCUMENTS

| | | | |
|---|---|---|---|
| 2006/0250659 A1* | 11/2006 | Contino | H04N 1/00482 358/296 |
| 2014/0063574 A1* | 3/2014 | Uchida | H04N 1/00596 358/498 |
| 2014/0369046 A1 | 12/2014 | Andoh | |
| 2016/0127590 A1 | 5/2016 | Hatayama et al. | |
| 2017/0134598 A1 | 5/2017 | Nagano et al. | |
| 2019/0052767 A1* | 2/2019 | Nagano | H04N 1/00816 |

FOREIGN PATENT DOCUMENTS

| | | |
|---|---|---|
| JP | 2006-270714 | 10/2006 |
| JP | 2011-061307 | 3/2011 |
| JP | 2011-066676 | 3/2011 |
| JP | 2011-097338 | 5/2011 |
| JP | 2011-203371 | 10/2011 |
| JP | 2012-145769 | 8/2012 |
| JP | 2016-088645 | 5/2016 |
| JP | 2017-090908 | 5/2017 |
| JP | 2019-004298 | 1/2019 |
| JP | 2019-033413 | 2/2019 |
| KR | 20110121959 A * | 10/2011 |

* cited by examiner

*Primary Examiner* — Moustapha Diaby
(74) *Attorney, Agent, or Firm* — Duft & Bornsen, PC (57) ABSTRACT

A card reading device and a card reading system. The card reading device includes an image scanner to read an image of a card. In the card reading device, the image scanner is usable when the card reading device is attached to a data receiving apparatus that receives data of the image scanned by the image scanner. In the card reading device, the image scanner is usable when the card reading device is detached from the data receiving apparatus. The card reading system includes the card reading device and the data receiving apparatus that receives the data of the image scanned by the image scanner.

19 Claims, 5 Drawing Sheets

CARD READING DEVICE AND CARD READING SYSTEM

CROSS-REFERENCE TO RELATED APPLICATION

This patent application is based on and claims priority pursuant to 35 U.S.C. § 119(a) to Japanese Patent Application No. 2021-082718, filed on May 14, 2021, in the Japan Patent Office, the entire disclosure of which is hereby incorporated by reference herein.

BACKGROUND

Technical Field

Embodiments of the present disclosure relate to a card reading device and a card reading system.

Background Art

In the related art, card reading devices have been proposed that include a conveyance unit that conveys a card and an image scanner that scans the image of the card conveyed by the conveyance unit.

In the related art, for example, a card scanner unit that serves as the above card reading device is provided for an image reading device of an image forming apparatus that serves as a data receiving apparatus.

SUMMARY

Embodiments of the present disclosure described herein provide a card reading device and a card reading system. The card reading device includes an image scanner to read an image of a card. In the card reading device, the image scanner is usable when the card reading device is attached to a data receiving apparatus that receives data of the image scanned by the image scanner. In the card reading device, the image scanner is usable when the card reading device is detached from the data receiving apparatus. The card reading system includes the card reading device and the data receiving apparatus that receives the data of the image scanned by the image scanner.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure are described below in detail with reference to the drawings.

Figure 1:
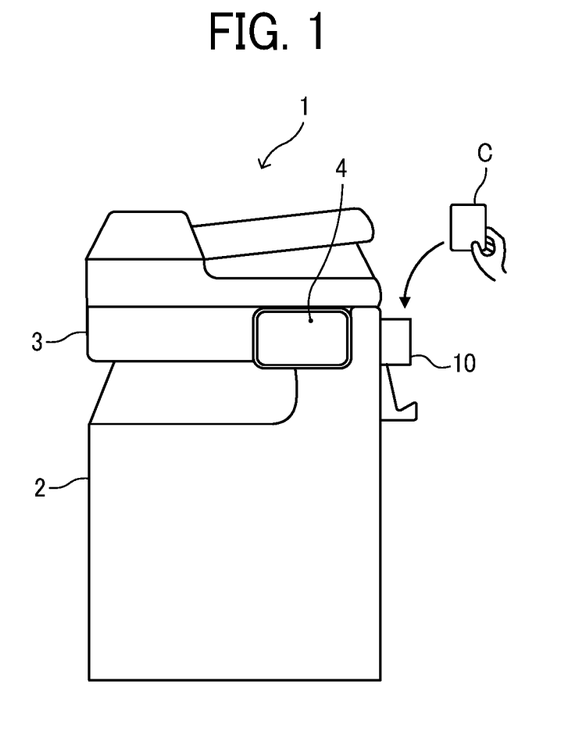
FIG. 1 is a schematic diagram illustrating how a card reading device is attached to an image forming apparatus and is used, according to an embodiment of the present disclosure.

FIG. 1 is a schematic diagram illustrating how a card reading device 10 is attached to an image forming apparatus 1 and is used, according to an embodiment of the present disclosure.

As illustrated in FIG. 1, the image forming apparatus 1 that serves as a data receiving apparatus includes an image forming device 2 that forms an image on a sheet and a scanner unit 3 that scans the document image. An operation panel 4 is arranged on the front surface of the image forming apparatus 1. A card reading device 10 is attached to a side 2a of the image forming device 2. The card reading device 10 may be attached to the scanner unit 3. The portion of the image forming apparatus to which the card reading device is to be attached is not limited to a side of the image forming apparatus. The card reading device may be attached to any part of the image forming apparatus such as the front plane of the image forming apparatus as long as the image forming apparatus can be used handily or easily.

No limitation is intended by the image forming device 2 according to the present embodiment, and any known method of forming an image may be adopted. For example, an electrophotographic method may be adopted in which a toner image is formed on a photoconductor. In such an electrophotographic method, the formed toner image is transferred to a sheet, and the toner image is then fixed to the sheet by a fixing device. Alternatively, ink-jet printing may be adopted in which ink is discharged from a liquid discharge head toward a sheet to form an image.

No limitation is intended by the scanner unit 3 according to the present embodiment, and any known scanner unit may be adopted. The scanner unit 3 according to the present embodiment is provided with a flatbed scanner that reads a document placed on a contact glass, and a sheet-feed scanner that conveys a document and scans the conveyed document.

The card reading device 10 is coupled to the image forming apparatus 1 through a wired connection or wireless local area network (LAN), and transfers the image data of a card read by the card reading device 10 to the image forming apparatus 1. The image forming apparatus 1 receives the image data of the card from the card reading device 10, and performs, for example, printing based on the received image data of the card.

The card reading device 10 according to the present embodiment includes a power cable, and can be detached from the image forming apparatus 1 and be used.

Figure 2:
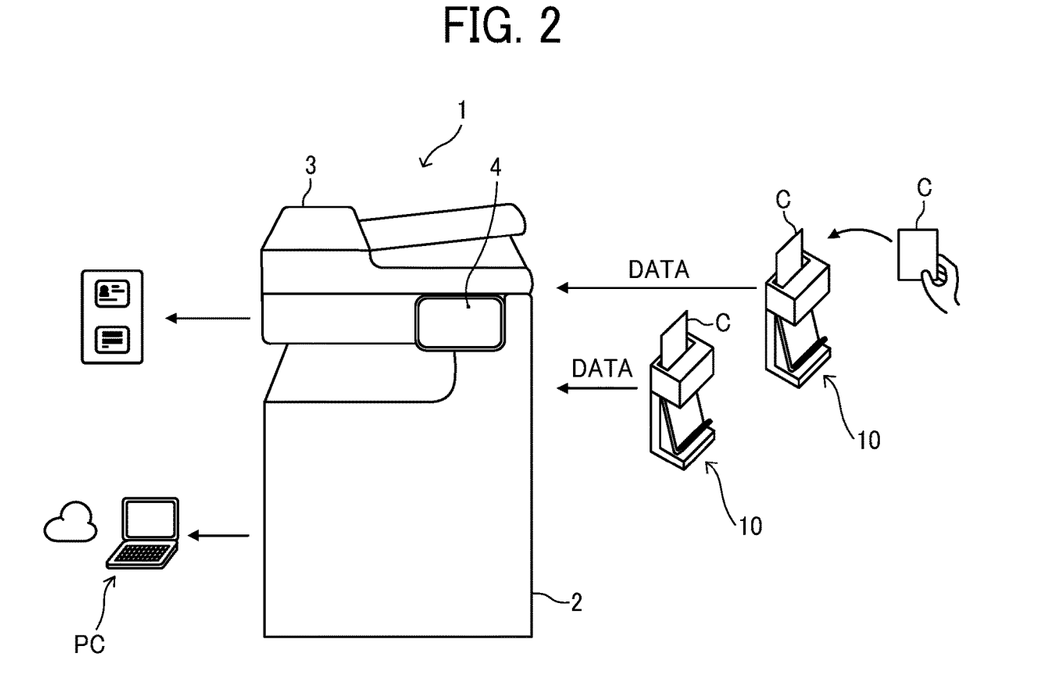
FIG. 2 is a schematic diagram illustrating how a card reading device is detached from an image forming apparatus and is used, according to an embodiment of the present disclosure.

FIG. 2 is a schematic diagram illustrating how the card reading device 10 is detached from the image forming apparatus 1 and is used, according to the present embodiment.

The image of a card is scanned and obtained by the card reading device 10 installed at a place apart from the place of installation of the image forming apparatus 1, and the data of the obtained image of the card is sent to the image forming apparatus 1 through a wired connection or wireless local area network (LAN). The image forming apparatus 1 receives the image data of the card from the card reading device 10, and performs, for example, data transfer to a personal computer (PC) or printing based on the received image data of the card.

The setting of whether to perform printing based on the image data of a card sent from the card reading device 10 or to transfer the image data of the card to, for example, a PC is set by manipulating the operation panel 4 of the image forming apparatus 1. Alternatively, a setting key or button may be provided for the card reading device 10 to allow the setting of whether the image of a card read by the card reading device 10 is to be printed or transferred to, for example, a personal computer PC.

In the related art, the card reading device 10 is provided for the scanner unit 3 of the image forming apparatus 1. For example, there are some cases in which a copy of the image of a driver's license or other sorts of license cards needs to be taken to prepare an identification document. Typically, an image forming apparatus tends to be installed at the back of a store. For this reason, when a copy of the image of a driver's license or other sorts of license card of a customer is taken, the card is taken away from a customer, and is moved to a place where the image forming apparatus is installed at the back of a store. This is something undesired, and may give a sense of unease to the customer.

By contrast, in the present embodiment, the card reading device 10 can be detached from the image forming apparatus. By so doing, the card reading device 10 can be used upon being installed at a place away from the image forming apparatus. Due to such a configuration, for example, the card reading device 10 according to the present embodiment can be placed at a reception desk of, for example, a store. Accordingly, the image of a driver's license or other sorts of license card of a customer can be scanned in front of the customer, or the customer himself or herself may insert a card C into the card reading device 10 to scan the image of the card. As a result, compared with a case where the card C of a customer is taken away and moved to the back of the store, the customer can have a feeling of security. According to the present embodiment, for example, when there are a plurality of reception desks or sales windows, the card reading device 10 can be set to each one of the multiple reception desks or sales windows. In so doing, the image forming apparatus 1 as a single unit can be shared by the multiple card reading devices 10.

The card reading device 10 according to the present embodiment may be used upon being attached to the image forming apparatus 1. For example, when a customer himself or herself operates the image forming apparatus 1 to make a copy of the image of a card in a convenience store, the card reading device 10 according to the present embodiment may be used upon being attached to the image forming apparatus 1.

In the present embodiment, both the card reading device 10 that is used upon being attached to the image forming apparatus 1 and the card reading device 10 that is used upon being installed at a place away from the image forming apparatus 1 may be arranged independently.

Figure 3:
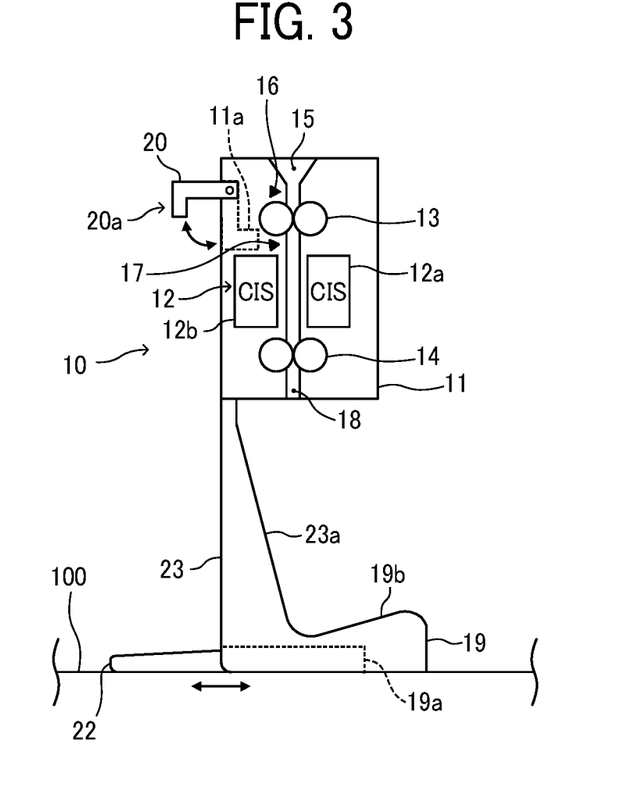
FIG. 3 is a schematic diagram of a card reading device, according to an embodiment of the present disclosure.

FIG. 3 is a schematic diagram of the card reading device 10, according to the present embodiment.

As illustrated in FIG. 3, the card reading device 10 includes a reading unit 11 that accommodates an image scanner 12 and a conveyance unit. The image scanner 12 according to the present embodiment is provided with a first reader 12a that reads an image on a first face A1 of the card C and a second reader 12b that reads an image on a second face A2 of the card C. The first reader 12a and the second reader 12b face each other across a card conveyance path.

The conveyance unit according to the present embodiment includes an input roller pair 13 arranged near a card insertion slot 15 and an output roller pair 14 arranged near a card ejection exit 18. The image scanner 12 is disposed between the input roller pair 13 and the output roller pair 14. The input roller pair 13 and the output roller pair 14 are given with driving force transmitted from a driving motor through gears, and the input roller pair 13 and the output roller pair 14 are driven to rotate at a predetermined number of revolutions per minute (rpm). An insertion sensor 16 is arranged upstream from the input roller pair 13 in the direction of conveying cards, and the installation position of the insertion sensor 16 is close to the input roller pair 13. A registration detector 17 is arranged between the input roller pair 13 and the image scanner 12.

The reading unit 11 is supported by a support portion 23, and a card output tray 19 that serves as a freestanding unit is arranged at the lower end of the support portion 23. The card output tray 19 makes the card reading device 10 stand on its own, and the card that is ejected from the reading unit 11 is ejected to the card output tray 19.

When the card reading device 10 according to the present embodiment is used upon being detached from the image forming apparatus, the card reading device 10 stands on its own and is used in a so-called vertical orientation. Due to this configuration, compared with a case where the card reading device 10 is used upon being placed in the horizontal direction, the occupied space on the installation surface 100 of, for example, a desk on which the card reading device 10 according to the present embodiment is installed can be reduced, and the available working space on the installation surface 100 increases.

When the card C is inserted into the card insertion slot 15, the insertion sensor 16 detects that the card C is inserted into the card insertion slot 15. When a predetermined time elapses after the insertion sensor 16 detects the insertion of the card, the drive motor is driven to rotate the input roller pair 13 and the output roller pair 14. Each roller pair is driven to rotate after the insertion of the card C is detected by the insertion sensor 16 and a predetermined period of time has passed. This is because the skew of the card is to be straightened when one end of the card C inserted into the card insertion slot 15 contacts the input roller pair 13.

As the card C is conveyed by the input roller pair 13, the registration detector 17 detects an end of the card C. Based on the results of detection performed by the registration detector 17, the first reader 12a and the second reader 12b start scanning the card when the leading end of the card C reaches the scanning position of the first reader 12a and the second reader 12b. While the card C is being conveyed by the input roller pair 13, the image on the first face A1 of the card is scanned by the first reader 12a, and the image on the second face A2 of the card is scanned by the second reader 12b. The card C whose images on both sides have been scanned and obtained is ejected by the output roller pair 14 from the card ejection exit 18 to the card output tray 19.

The card reading device 10 according to the present embodiment conveys the card C from top to bottom. When the rear end of the card C passes through the output roller pair 14, the card drops into the card output tray 19 without restraint. A plane 19b of the card output tray 19 that receives the dropped card C is a plane inclined toward the support portion 23 in the downward direction. Accordingly, the card that has dropped into the card output tray 19 falls toward the support portion 23 side, and the output cards are stacked on the card output tray 19. The plane 19b that receives the card C is inclined such that an end of the card C does not slip out of the card output tray 19 when the card C collapses toward the support portion 23.

A side surface 23a of the support portion 23 on the card output tray side is an inclined surface along falling of the ejected card, and the card ejected to the card output tray is stacked along the side surface 23a of the support portion 23.

Figure 4:
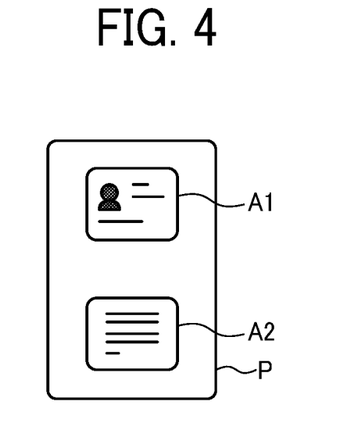
FIG. 4 is a diagram illustrating a printed material in which the image on a first face of a card and the image on a second face of the card are collectively printed on one page, according to an embodiment of the present disclosure.

FIG. 4 is a diagram illustrating a printed material in which the image on a first face A1 of the card C and the image on a second face A2 of the card C are collectively printed on one page, according to the present embodiment.

The data of the image on the first face A1 of the card and the data of the image on the second face A2 of the card, which are read by the card reading device 10, are sent to the image forming apparatus 1. As illustrated in FIG. 4, when set to the print mode, the image forming apparatus 1 collectively prints the image A1 on the first face of the card C and the image A2 on the second face of the card C on one page. On the other hand, when set to the transfer mode is set, one item of image data into which the data of the image on the first face A1 of the card C and the data of the image on the second face A2 of the card C are integrated is transferred to a set destination device such as a personal computer (PC).

As described above, in the present embodiment, both sides of the card C can be read only by passing the card through the card reading device 10. In other words, both sides of the card C can be scanned and obtained easily compared with a case in which the card C is placed on the flatbed of the scanner unit 3 to scan the image on the first face A1 of the card C and then the card is turned over to scan the image on the second face A2 of the card C.

In the present embodiment described above, the registration detector 17 is arranged, and the image of a card is scanned based on the result of detection performed by the registration detector 17. However, the registration detector 17 is not essential and may be omitted. When the registration detector 17 is absent, for example, the first reader 12a and the second reader 12b start scanning when the input roller pair 13 is driven to rotate, and the data of an image whose dimension is longer than the size of the card C in the conveyance direction of the card is obtained. Then, the boundary between the background image and the card C or the edges of the card C are detected to crop the image of the card C. As a result, the data of the image of the card C to be sent to the image forming apparatus 1 can be prepared.

In the card reading device 10 according to the present embodiment, the card output tray 19 is a leg part that serves as a freestanding unit. With such a leg part, the card reading device 10 can stand on its own on the installation surface 100. A freestanding support 22 is slidably attached to the card output tray 19. When the card reading device 10 is placed on the installation surface 100, the freestanding support 22 is pulled out from the supporting member housing 19a of the card output tray 19. As a result, the contact area of the card reading device 10 with the installation surface 100 is widened, and the card reading device 10 can stably stand on its own.

The card reading device 10 according to the present embodiment has a hook 20 to be attached to the image forming apparatus 1. The hook 20 is attached to the reading unit 11 in a pivotable manner. The hook 20 has a hook-like shape with its tip bent at 90 degrees.

The reading unit 11 according to the present embodiment has a hook storage unit 11a used to store the above hook 20. The hook 20 according to the present embodiment is attached to the reading unit 11 in a pivotable manner between a stored position at which the hook 20 is stored in the hook storage unit 11a and a device installation position indicated by a solid line in FIG. 3. It is desired that a locking mechanism be arranged to lock the hook 20 at the above-mentioned device installation position. The hook 20 rotates from the device installation position to the stored position by its own weight. For this reason, there is some concern that the hook 20 may rotate and move to the stored position by its own weight when the hook 20 is hooked and attached to the image forming apparatus and the operation of attaching the card reading device 10 to the image forming apparatus 1 cannot easily be performed. In order to avoid such a situation, the hook 20 is fixed at the device installation position by the lock mechanism. As a result, the operation of attaching the card reading device 10 to the image forming apparatus 1 can easily be performed.

More preferably, the hook 20 is also locked at the stored position. Due to such a configuration, the hook 20 can be prevented from pivoting and jumping out of the stored position when the card reading device is tilted or when the card reading device is carried.

Figure 5:
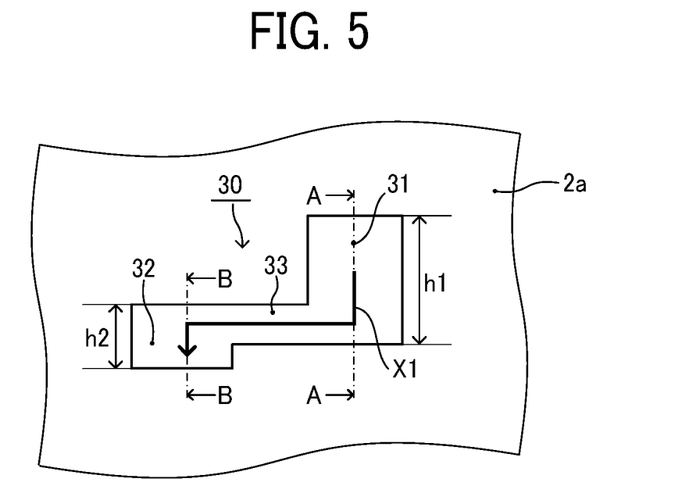
FIG. 5 is a schematic view of a hanger hole formed on a side of an image forming device, according to an embodiment of the present disclosure.

FIG. 5 is a schematic diagram of a hanger hole 30 formed on a side 2a of the image forming device 2, where the hook 20 of the card reading device 10 is hooked on the hanger hole 30, according to the present embodiment.

Figure 6A:
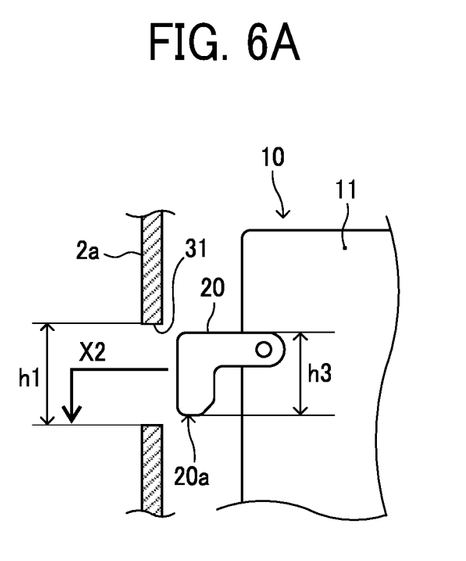
FIG. 6A is an A-A sectional view of FIG. 5, according to an embodiment of the present disclosure.
Figure 6B:
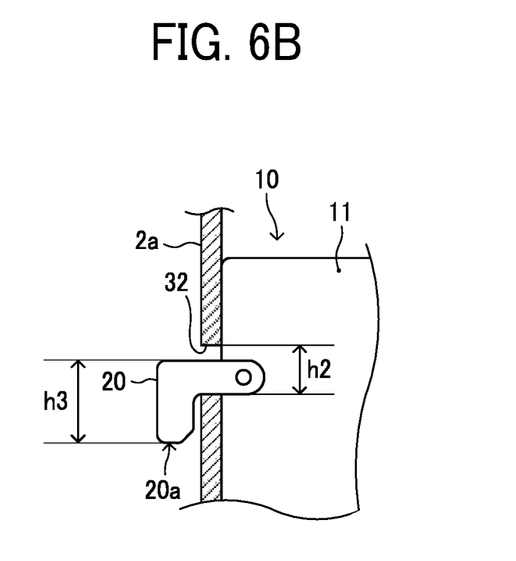
FIG. 6B is a B-B sectional view of FIG. 5, according to an embodiment of the present disclosure.

FIG. 6A is an A-A sectional view of FIG. 5, and FIG. 6B is a B-B sectional view of FIG. 5, according to the present embodiment.

As illustrated in FIG. 5, the hanger hole 30 according to the present embodiment has an insertion portion 31, a to-be-hooked portion 32, and a connecting part 33. The insertion portion 31 according to the present embodiment is an area through which the tip 20a of the hook 20 is inserted. As illustrated in FIG. 6A, the vertical length h1 of the insertion portion 31 in the up-and-down directions is longer than the length h3 of the tip 20a in the up-and-down directions.

The to-be-hooked portion 32 and the insertion portion 31 are located at different positions in the horizontal direction. As illustrated in FIG. 6B, the vertical length h2 of the to-be-hooked portion 32 in the up-and-down directions is shorter than the length h3 of the tip 20a in the up-and-down directions. The connecting part 33 extends in the horizontal direction, and connects the insertion portion 31 and the to-be-hooked portion 32. The length of the connecting part 33 in the up-and-down directions is longer than the length of a portion of the hook 20 other than the tip 20a in the up-and-down directions.

As illustrated in FIG. 5, one end of the connecting part 33 is coupled to the lower end of the insertion portion 31, and the other end is coupled to the upper end of the to-be-hooked portion 32.

When the card reading device 10 is attached to the image forming apparatus 1, firstly, the freestanding support 22 is slid, and the freestanding support 22 is then moved to the supporting member housing 19a. Subsequently, the hook 20 that is located at the stored position is controlled to pivot, and is moved to the installed position of the image forming apparatus 1. Then, as indicated by an arrow X2 in FIG. 6A, the hook 20 of the card reading device 10 is inserted into the insertion portion 31, and the tip 20a of the hook 20 is moved to the inside of the image forming device 2. Once the hook 20 is inserted into the insertion portion 31, as indicated by an arrow X1 in FIG. 5, the card reading device 10 is moved downward and then is slid in the horizontal direction. As a result, the hook 20 horizontally moves toward the to-be-hooked portion 32 inside the connecting part 33. When the hook 20 reaches the to-be-hooked portion 32, the card reading device 10 is moved downward. As a result, as illustrated in FIG. 6B, the tip 20a of the hook 20 faces the inner surface of the side 2a of the image forming device 2, and the card reading device 10 is attached to the image forming apparatus 1 in a hooked manner.

As illustrated in FIG. 3, the lateral side of the card reading device 10 on the other side of the card output tray 19 is a surface parallel to the vertical direction. Accordingly, when the card reading device 10 is hooked and attached to the image forming apparatus 1, the side surface on the other side of the card output tray 19 contacts the side 2a of the image forming device 2 through its entire area. Accordingly, the card reading device 10 can be attached to the image forming apparatus 1 with substantially the same posture as when the card reading device 10 is placed on the installation surface 100.

In the present embodiment, the vertical length h2 of the to-be-hooked portion 32 in the up-and-down directions is shorter than the length h3 of the tip 20a of the hook 20 in the up-and-down directions. Due to such a configuration, regardless of where the hook 20 is positioned inside the to-be-hooked portion 32, at least some portion of the tip 20a faces the inner surface of the side 2a, and the hook 20 can stably be hung, and the hook 20 can be prevented from slipping off the to-be-hooked portion 32. Accordingly, the hook 20 can be prevented from being unintentionally detached from the hanger hole 30. Further, one end of the connecting part 33 is coupled to the upper end of the to-be-hooked portion 32. Accordingly, the hook 20 can be prevented from being moved from the to-be-hooked portion 32 to the insertion portion 31 through the connecting part 33 in an unintentional manner. Accordingly, the hook 20 can further be prevented from being unintentionally detached from the hanger hole 30.

In the present embodiment, the tip 20a of the hook 20 is bent downward. However, no limitation is intended thereby, and the tip 20a may be bent in the horizontal direction. With such a configuration, the connecting part 33 of the hanger hole 30 of the image forming apparatus can be used as the insertion portion 31 into which the tip of the hook is inserted, and the insertion portion 31 can be eliminated.

The tip 20a is satisfactory as long as it has a shape larger than the hole shape of the to-be-hooked portion 32, and no limitation is indicated by the configuration or structure as described above. As long as the tip 20a has a shape larger than the hole shape of the to-be-hooked portion 32, regardless of where the hook 20 is positioned inside the to-be-hooked portion 32, at least some portion of the tip 20a faces the inner surface of the side 2a, and the hook 20 can stably be hung.

The length of the connecting part 33 in the up-and-down directions is shorter than the length of the tip 20a of the hook 20 in the up-and-down directions. As a result, the tip 20a can be horizontally moved from the insertion portion 31 to the to-be-hooked portion 32 so as to face the side 2a of the image forming device 2. Due to such a configuration, the hook 20 can be horizontally moved from the insertion portion 31 to the to-be-hooked portion 32 when the hook 20 is hooked on the side 2a of the image forming device 2. As a result, when the hook 20 is horizontally moved from the insertion portion 31 to the to-be-hooked portion 32, the hook 20 can be prevented from being detached from the hanger hole 30, and the card reading device 10 can be easily attached to the image forming apparatus 1.

The connecting part 33 is connected to a lower end of the insertion portion 31. Due to this configuration, after the tip 20a of the hook 20 is inserted into the insertion portion 31 and the hook 20 contacts the lower end of the insertion portion 31, the tip 20a faces the inner surface of the side 2a of the image forming device 2, and the hook 20 is hooked on the image forming device 2. Due to this configuration, after the hook 20 contacts the lower end of the insertion portion 31, the hook 20 can be moved to the connecting part 33 in the horizontal direction without being bothered by the position in the vertical direction with respect to the side 2a of the card reading device 10. Due to such a configuration, the card reading device 10 can be easily attached to the image forming apparatus 1.

When the card reading device 10 according to the present embodiment is used upon being detached from the image forming apparatus, the card reading device 10 may be operated using the procedure reverse to the above. By so doing, the card reading device 10 can be detached from the image forming apparatus 1. In other words, firstly, the card reading device 10 is lifted and is horizontally moved toward the insertion portion 31, and then the card reading device 10 is lifted again at the insertion portion 31. Secondly, the card reading device 10 is detached from a side of the image forming apparatus 1, and the hook 20 is pulled out from the insertion portion 31. By so doing, the card reading device 10 can be detached from the image forming apparatus 1.

As described above, the card reading device 10 is attached to the image forming apparatus 1 in a hooked manner. By so doing, compared with a case in which the card reading device 10 is attached to the image forming apparatus 1 by screws, the card reading device 10 can easily be attached to or detached from the image forming apparatus 1. Accordingly, the card reading device 10 can be easily detached from the image forming apparatus 1 when it is desired to use the card reading device 10 at a place away from the image forming apparatus 1, and can be easily returned to the image forming apparatus 1 after the card reading device 10 is used.

The hanger hole 30 disposed on the side 2a of the image forming device 2 is preferably configured to be hidden by the card reading device 10 when the card reading device 10 is attached. When the card reading device 10 is detached from the image forming apparatus 1, it is desired that the hanger hole 30 be covered such that the hanger hole 30 cannot be seen.

In the above embodiments of the present disclosure, the image forming apparatus 1 is provided with the scanner unit 3. However, no limitation is indicated thereby, and the embodiments of the present disclosure can also be applied to an image forming apparatus that is not provided with the scanner unit 3. In the above description, the image forming apparatus 1 according to the above embodiments of the present disclosure is used as the data receiving apparatus that receives the data of the image of the card scanned and obtained by the card reading device 10. However, no limitation is intended thereby, and the data receiving apparatus may be, for example, a personal computer (PC) or a server.

The embodiments described above are given as an example, and unique advantageous effects are achieved for each of the following modes given below.

First Mode

A card reading device comprises an image scanner configured to read an image of a card. In the card reading device according to the first mode of the present disclosure, the image scanner according to the present mode is usable upon being attached to a data receiving apparatus such as the image forming apparatus 1 according to the above embodiments of the present disclosure that receives the data of the image scanned by the image scanner, and the image scanner according to the present mode is usable upon being detached from the data receiving apparatus.

With the card reading device according to the first mode of the present disclosure, the card reading device can be arranged at a place away from the data receiving apparatus, and the image of a card can be scanned and obtained. Accordingly, the image of a card can be scanned and obtained without going to the place at which the data receiving apparatus is installed.

Second Mode

The card reading device according to the first mode of the present disclosure further comprises a hook to be hooked to a hanger hole such as the hanger hole 30 formed on the data receiving apparatus such as the image forming apparatus 1.

With the card reading device according to the second mode of the present disclosure, as described above in the embodiments of the present disclosure, as the hook 20 is hooked to the hanger hole 30, the card reading device 10 can be attached to a data receiving apparatus such as the image forming apparatus 1. Due to such a configuration, compared with a case in which the card reading device 10 is attached to the image forming apparatus 1 by screw, the card reading device can easily be attached to or detached from the image forming apparatus 1. Accordingly, the card reading device 10 can be easily detached from the image forming apparatus 1 when it is desired to use the card reading device 10 at a place away from the image forming apparatus 1, and can be easily returned to the image forming apparatus 1 after the card reading device 10 is used.

Third Mode

In the card reading device according to the second mode of the present disclosure, the hook 20 is retractable to a housing of the card reading device.

With the card reading device according to the third mode of the present disclosure, the hook 20 can be used upon being retracted to a housing of the card reading device when the card reading device 10 is used upon being detached from the image forming apparatus 1. Accordingly, when the card reading device is used upon being detached from the image forming apparatus 1, the outward appearance of the card reading device can be made neat.

Fourth Mode

The card reading device according to any one of the first mode to the third mode of the present disclosure further comprises a freestanding unit such as the card output tray 19 with which the card reading device can stand on its own when the card reading device is used upon being detached from the data receiving apparatus such as the image forming apparatus 1.

With the card reading device according to the fourth mode of the present disclosure, as described above in the embodiments of the present disclosure, when the card reading device is used upon being detached from the data receiving apparatus such as the image forming apparatus 1, the card reading device can be used on the installation surface 100 in a vertical orientation. As a result, the occupied space on the installation surface 100 can be reduced compared with a case where the card reading device is used upon being placed in the horizontal direction.

Fifth Mode

In the card reading device according to the fourth mode of the present disclosure, a freestanding unit such as the card output tray 19 according to the above embodiments of the present disclosure also serves as an output tray to which the card whose images are scanned and obtained by the image scanner is ejected.

With the card reading device according to the fifth mode of the present disclosure, the number of parts can be reduced and the cost of the apparatus can be reduced as compared with the case where the output tray and the freestanding unit are separately provided. As a result, the production cost of a device or apparatus can be reduced.

Sixth Mode

The card reading device according to the fourth mode or the fifth mode of the present disclosure further comprises the freestanding support 22 configured to be movable between a stored position and a freestanding assistance position at which the card reading device 10 is assisted to stand on its own.

With the card reading device according to the sixth mode of the present disclosure, as described above in the embodiments of the present disclosure, the card reading device 10 can stand on its own more stably than when the card reading device 10 is made stand on its own only with the freestanding unit. When the card reading device 10 is attached to the data receiving apparatus such as the image forming apparatus 1, the freestanding support 22 is moved to the stored position. Due to such a configuration, when the card reading device 10 is attached to the data receiving apparatus, the freestanding support 22 does not cause any inconvenience or annoyance.

Seventh Mode

In the card reading device according to any one of the first mode to the sixth mode of the present disclosure, the image scanner further comprises a first reader 12a that reads an image on a first face of the card and a second reader 12b configured to read an image on a second face of the card on a reverse side of the first face.

With the card reading device according to the seventh mode of the present disclosure, as described above in the embodiments of the present disclosure, the images on both sides of the card can be read by passing the card only once.

Eighth Mode

The card reading device according to any one of the first mode to the seventh mode of the present disclosure further comprises a power cable to supply power from an external power source.

With the card reading device according to the eighth mode of the present disclosure, as described above in the embodiments of the present disclosure, even when the card reading device 10 is detached from the image forming apparatus, the images on a card can be scanned and obtained by driving, for example, the image scanner.

Ninth Mode

A card reading system comprises the card reading device 10 according to the above embodiments of the present disclosure, and a data receiving apparatus such as the image forming apparatus 1 according to the above embodiments of the present disclosure configured to receive data of an image scanned by an image scanner. In the ninth mode of the present disclosure, the card reading device according to any one of the first mode to the eighth mode of the present disclosure is used as the card reading device 10 according to the above embodiments of the present disclosure.

With the card reading system according to the ninth mode of the present disclosure, as described above in the embodiments of the present disclosure, the card reading device can be used at a location distant from the data receiving apparatus such as the image forming apparatus 1.

Tenth Mode

In the card reading system according to the ninth mode of the present disclosure, the data receiving apparatus such as the image forming apparatus 1 according to the above embodiments of the present disclosure comprises a hanger hole such as the hanger hole 30 according to the above embodiments of the present disclosure on which the hook 20 of the card reading device 10 is hung, and the hanger hole comprises an insertion portion 31 into which the hook 20 is inserted, a to-be-hooked portion 32 on which the hook 20 is hung, a connecting part 33 connecting the insertion portion 31 and the to-be-hooked portion 32.

With the card reading system according to the tenth mode of the present disclosure, as described above in the embodiments of the present disclosure, the card reading device 10 can be attached to a data receiving apparatus such as the image forming apparatus 1 according to the above embodiments of the present disclosure by moving the hook 20 to the to-be-hooked portion 32 through the connecting part 33 after the tip 20a of the hook 20 is inserted into the insertion portion 31.

Unless the hook 20 moves to the insertion portion 31 through the connecting part 33, the hook 20 can be prevented from being detached from a hanger hole such as the hanger hole 30 according to the above embodiments of the present disclosure, and the card reading device 10 can be prevented from being detached from the data receiving apparatus in an unintentional manner.

Eleventh Mode

In the card reading system according to the tenth mode of the present disclosure, the tip 20a of the hook 20 has a shape larger than the hole shape of the to-be-hooked portion 32.

With the card reading system according to the eleventh mode of the present disclosure, as described above in the embodiments of the present disclosure, regardless of where the hook 20 is positioned inside the to-be-hooked portion 32, the tip 20a faces the inner surface of a flat plate that is a part of the image forming apparatus 1 where the hanger hole is formed, and the hook 20 can stably be hung. Accordingly, the hook 20 can be prevented from slipping off the to-be-hooked portion 32 of the hanger hole in an unintentional manner.

Twelfth Mode

In the card reading system according to any one of the ninth mode to the eleventh mode of the present disclosure, the data receiving apparatus is the image forming apparatus 1 according to the above embodiments of the present disclosure, and the image scanner of the card reading device 10 comprises a first reader 12a that reads an image on a first face of the card and a second reader 12b configured to read an image on a second face of the card on a reverse side of the first face of the card. In the twelfth mode of the present disclosure, the image forming apparatus 1 is configured to print the image on the first face of the card and the image on the second face of the card collectively on one page.

With the card reading system according to the twelfth mode of the present disclosure, as described above in the embodiments of the present disclosure, a copy of the images on both sides of a card can be obtained just by inserting the card into a slit of the card reading device 10. As the image on the first face of the card and the image on the second face of the card are collectively printed on one page, redundant costs of sheets of paper can be reduced.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A card reading device comprising
an image scanner configured to read an image of a card, the image scanner being usable when the card reading device is attached in a hooked manner to a data receiving apparatus that receives data of the image scanned by the image scanner, and the image scanner being usable when the card reading device is detached from the data receiving apparatus.

2. The card reading device according to claim 1, further comprising
a hook to be hooked to a hanger hole of the data receiving apparatus.

3. The card reading device according to claim 2,
wherein the hook is retractable to a housing of the card reading device.

4. The card reading device according to claim 1, further comprising
a freestanding unit with which the card reading device is able to stand on its own when the card reading device is used upon being detached from the data receiving apparatus.

5. The card reading device according to claim 4,
wherein the freestanding unit includes an output tray to which the card whose images are scanned and obtained by the image scanner is ejected.

6. The card reading device according to claim 4, further comprising
a freestanding support configured to be movable between a stored position and a freestanding assistance position at which the card reading device is assisted to stand on its own.

7. The card reading device according to claim 1,
wherein the image scanner comprises:
a first reader configured to read an image on a first face of the card; and
a second reader configured to read an image on a second face of the card on a reverse side of the first face.

8. The card reading device according to claim 1, further comprising
a power cable to supply power from an external power source.

9. A card reading system comprising:
the card reading device according to claim 1; and
the data receiving apparatus configured to receive the data of the image scanned by an image scanner.

10. The card reading system according to claim 9,
wherein the data receiving apparatus comprises a hanger hole on which a hook of the card reading device is hooked, and
wherein the hanger hole comprises:
an insertion portion into which the hook is inserted;
a to-be-hooked portion on which the hook is hooked; and
a connecting part connecting the insertion portion and the to-be-hooked portion.

11. The card reading system according to claim 10,
wherein the hook has a tip whose shape is larger than a hole shape of the to-be-hooked portion.

12. The card reading system according to claim 9,
wherein the data receiving apparatus is an image forming apparatus,
wherein the image scanner of the card reading device comprises:
a first reader configured to read an image on a first face of the card; and
a second reader configured to read an image on a second face of the card on a reverse side of the first face,
wherein the image forming apparatus is configured to print the image on the first face of the card and the image on the second face of the card collectively on one page.

13. The card reading system according to claim 9,
wherein the data receiving apparatus is an image forming apparatus,
wherein the card reading device further comprises
a freestanding unit with which the card reading device is able to stand on its own when the card reading device is used upon being detached from the image forming apparatus; and
a freestanding support configured to be movable between a stored position and a freestanding assistance position at which the card reading device is assisted to stand on its own; and
wherein the freestanding unit includes an output tray to which the card whose images are scanned and obtained by the image scanner is ejected.

14. A card reading device comprising
an image scanner configured to read an image of a card, the image scanner being usable when the card reading device is attached to a data receiving apparatus that receives data of the image scanned by the image scanner, and the image scanner being usable when the card reading device is detached from the data receiving apparatus;
a freestanding unit with which the card reading device is able to stand on its own when the card reading device is used upon being detached from the data receiving apparatus; and
a freestanding support configured to be movable between a stored position and a freestanding assistance position at which the card reading device is assisted to stand on its own.

15. The card reading device according to claim 14,
wherein the freestanding unit includes an output tray to which the card whose images are scanned and obtained by the image scanner is ejected.

16. The card reading device according to claim 14, further comprising
a hook to be hooked to a hanger hole of the data receiving apparatus.

17. The card reading device according to claim 16,
wherein the hook is retractable to a housing of the card reading device.

18. The card reading device according to claim 14,
wherein the image scanner comprises:
a first reader configured to read an image on a first face of the card; and
a second reader configured to read an image on a second face of the card on a reverse side of the first face.

19. The card reading system according to claim 18,
wherein the data receiving apparatus is an image forming apparatus configured to print the image on the first face of the card and the image on the second face of the card collectively on one page.

* * * * *